US006645290B1

(12) United States Patent
Barbour

(10) Patent No.: US 6,645,290 B1
(45) Date of Patent: Nov. 11, 2003

(54) SETTABLE COMPOSITION CONTAINING CEMENT KILN DUST

(76) Inventor: Ronald Lee Barbour, 110 Brookside Dr., Apt. 2, Dover, OH (US) 44622

(*) Notice: Subject to any disclaimer, the term of this patent is extended or adjusted under 35 U.S.C. 154(b) by 0 days.

(21) Appl. No.: 09/972,153

(22) Filed: Oct. 9, 2001

(51) Int. Cl.[7] .............................................. C04B 18/06
(52) U.S. Cl. ....................... 106/705; 106/707; 106/709; 106/714; 106/716; 106/DIG. 1
(58) Field of Search ................. 106/705, 707, 106/709, 714, 716, DIG. 1

(56) References Cited

U.S. PATENT DOCUMENTS

| | | | |
|---|---|---|---|
| 4,018,617 A | | 4/1977 | Nicholson |
| 4,101,332 A | * | 7/1978 | Nicholson .............. 106/DIG. 1 |
| 4,210,457 A | | 7/1980 | Dodson et al. |
| 4,240,952 A | | 12/1980 | Hulbert, Jr. et al. |
| 4,268,316 A | | 5/1981 | Wills, Jr. |
| RE30,943 E | * | 5/1982 | Nicholson .............. 106/DIG. 1 |
| 4,407,677 A | | 10/1983 | Wills, Jr. |
| 4,451,295 A | * | 5/1984 | Sprouse |
| 4,992,102 A | * | 2/1991 | Barbour ..................... 106/645 |
| 5,106,422 A | * | 4/1992 | Bennett et al. ............. 106/705 |
| 5,266,111 A | | 11/1993 | Barbour |
| 5,484,479 A | | 1/1996 | Weber |
| 5,520,730 A | | 5/1996 | Barbour |
| 5,565,028 A | | 10/1996 | Roy et al. |
| 5,681,384 A | | 10/1997 | Liskowitz et al. |
| 6,277,189 B1 | | 8/2001 | Chugh |

* cited by examiner

*Primary Examiner*—Paul Marcantoni
(74) *Attorney, Agent, or Firm*—Blank Rome LLP

(57) ABSTRACT

The present invention relates to settable compositions for general purpose concrete construction containing Class-F fly ash, Class-C fly ash or slag, and cement kiln dust (CKD) as a substantial replacement for Portland cement conventionally used in such compositions. The compositions of the present invention provide high early strength thereby allowing the concrete structure to be put into service sooner, reducing labor cost, and allowing precast concrete and concrete masonry manufacturers to achieve rapid form and mold turnover.

48 Claims, No Drawings

SETTABLE COMPOSITION CONTAINING CEMENT KILN DUST

FIELD OF THE INVENTION

This invention relates to the field of settable compositions for general purpose concrete construction containing Class-F fly ash, Class-C fly ash or slag, and cement kiln dust (CKD) as a substantial replacement for Portland cement conventionally used in such compositions.

BACKGROUND OF THE INVENTION

This invention is concerned with the utilization of four industrial by-products; namely, Class-F fly ash, Class-C fly ash, blast furnace slag, and cement kiln dust (CKD) in general purpose concrete-making composition. When finely divided or pulverized coal is combusted at high temperatures, for example, in boilers for the steam generation of electricity, the ash consisting of the incombustible residue plus a small amount of residual combustible matter, is made up of two fractions, a bottom ash recovered from the furnace or boiler in the form of a slag-like material and a fly ash which remains suspended in the flue gases from the combustion until separated therefrom by known separation techniques, such as electrostatic precipitation. This fly ash is an extremely finely divided material generally in the form of spherical bead-like particles, with at least 70% by weight passing a 200 mesh sieve and has a generally glassy state, resulting from fusion or sintering during combustion. As recognized in the American Society of Testing Materials (ASTM) specification designations C618-00 entitled "Fly Ash and Raw or Calcined Natural Pozzolan for Use as a Mineral Admixture in Portland Cement Concrete" and D5370-96 entitled "Standard Specification for Pozzolanic Blended Materials in Construction Application," fly ash is subdivided into two distinct classifications; namely, Class-F and Class-C. The definitions of these two classes are as follows:

"Class-F—Fly ash normally produced from burning anthracite or bituminous coal that meets the applicable requirements for this class as given herein. This class fly ash has Pozzolanic properties.

Class-C—Fly ash normally produced from lignite or subbituminous coal that meets the applicable requirements for this class as given herein. This class of fly ash, in addition to having pozzolanic properties, also has some cementitious properties. Some Class-C fly ashes may contain lime contents higher than 10%."

The latter reference to "pozzolanic properties" refers to the capability of certain mixtures that are not in themselves cementitious, but are capable of undergoing a cementitious reaction when mixed with calcium hydroxide in the presence of water. Class-C fly ash possesses direct cementitious properties as well as pozzolanic properties. ASTM C618-00 is also applicable to natural pozzolanic materials that are separately classified as Class N but are not pertinent here.

As the above quotation indicates, the type of coal to be combusted generally determines which class fly ash results, and the type of coal in turn is often dependent on its geographic origin. Thus, Class-C fly ash frequently results from coals mined in the Midwest; whereas Class-F fly ash often comes from coals mined in the Appalachian region. The ASTM specification imposes certain chemical and physical requirements upon the respective fly ash classifications which are set forth in U.S. Pat. No. 5,520,730 which is incorporated herein by reference.

CKD, on the other hand, is a by-product of the production of Portland cement clinkers by the high temperature furmacing of appropriate raw materials, typically mixtures of limestone and clay or a low grade limestone already containing a sufficient quantity of argillaceous materials often with added quantities of lime to adjust the final composition. The resultant clinkers are pulverized by grinding with gypsum to a high degree of fineness and these particles upon admixture with sand gravel and sufficient water undergo a cementitious reaction and produce the solid product generally referred to as concrete, which exhibits high compressive strength and is thus highly useful in construction of a great variety of building or supporting structures. Generally, rotary furnaces are used for producing Portland cement clinkers and a certain quantity of finely divided dust is produced as a by-product that is carried off in the flue gases from such furnaces. The dust content can range from about 5% of the clinkers output in so-called wet process plants up to as high as 15% in dry process plants. The suspended dust is removed by various separating techniques and remains as a by-product of the cement making operation. Part of the CKD can be returned to the furnace as recycled raw material, but it is not readily reincorporated into clinker formation and, in addition, tends to excessively elevate the alkalinity of the ultimate Portland cement.

Blast furnace slag is a by-product from the production of iron in a blast furnace; silicon, calcium, aluminum, magnesium and oxygen are the major elemental components of the slag. Blast furnace slags include air-cooled slag resulting from solidification of molten blast furnace slag under atmospheric conditions; granulated blast furnace slag, a glassy granular material formed when molten blast furnace slag is rapidly chilled as by immersion in water; and pelletized blast furnace slag produced by passing molten slag over a vibrating feed plate where it is expanded and cooled by water sprays, whence it passes onto a rotating drum from which it is dispatched into the air where it rapidly solidifies to spherical pellets. In general the glass content of the slag determines the cementitious character, rapidly cooled slags have a higher glass content and are cementitious; slowly cooled slags are non-glassy and crystalline and thus do not have significant cementitious properties.

The quantities of these by-product materials that are produced annually are enormous and are likely only to increase in the future. As petroleum oil as the fuel for the generation of electricity is reduced because of conservation efforts and unfavorable economics, and as political considerations increasingly preclude the construction of new nuclear power electrical generating facilities, or even the operation of already completed units of this type, greater reliance will necessarily fall on coal as the fuel for generating electricity. As of 1979, the amount of CKD was estimated as accumulating at a rate of 4–12 million tons per year in the United States alone, whereas the amount of Class-F fly ash that is available is estimated to be about five times what can be readily utilized. The estimated yearly total production of coal ash in the U.S. is about 66.8 million tons, while the yearly total coal ash sales in the U.S. is about 14.5 million tons. Further, in Canada, the recovery of copper, nickel, lead and zinc from their ores produces over twelve million tons of slag per year, which usually accumulated near the smelters without significant use. Obviously, there is an urgent growing need to find effective ways of employing these unavoidable industrial by-products since otherwise they will collect at a staggering rate and create crucial concerns over their adverse environmental effect.

Various proposals have already been made for utilizing both fly ash and CKD. According to Lea (1971), *The Chemistry of Cement and Concrete*, Chemical Publishing Company, Inc., page 421 et seq., fly ash, i.e., Class-F type, from boilers was first reported to be potentially useful as a partial replacement for Portland cement in concrete construction about 50 years ago, and its utilization for that purpose has since become increasingly widespread. It is generally accepted that the proportion of Portland cement replaced by the usual fly ash should not exceed about 20% to avoid significant reduction in the compressive strength of the resultant concrete, although some more cautious jurisdictions may impose lower limits, e.g., the 15% maximum authorized by the Virginia Department of Highways and Transportation (VDHT). As described in Lea on page 437, the substitution of fly ash tends to retard the early rate of hardening of the concrete so that the concrete shows up to a 30% lower strength after seven days testing and up to a 25% lower strength after 28 days of testing, but in time the strength levels equalize at replacement levels up to 20%. Increasing the substitution quantity up to 30% gives more drastic reduction in the early compression values plus an ultimate reduction of at least about 15% after one year.

The limited substitution of fly ash for Portland cement in concrete formulations has other effects beyond compressive strength changes, both positive and negative. The fly ash tends to increase the workability of the cement mix and is recognized as desirably reducing the reactivity of the Portland cement with so-called reactive aggregates. On the other hand, fly ash contains a minor content of uncombusted carbon that acts to absorb air entrained in the concrete. Because entrained air increases the resistance of the hardened concrete to freezing, such reduction is undesirable but can be compensated for by the inclusion as an additive of so-called air-entraining agents.

Dodson, et al. in U.S. Pat. No. 4,210,457, while recognizing the accepted limit of 20% replacement with fly ash of the Portland cement in concrete mixes, proposed the substitution of larger amounts, preferably 50% or more, of the Portland cement with particular selected fly ashes having a combined content of silica, alumina and ferric oxide content, less than 80% by weight, and a calcium oxide content exceeding 10%, based on five samples of such ashes, varying from about 58–72% combined with a calcium oxide range of about 18–30%. Six other fly ash samples that are not suitable at the high replacement levels of 50% or more were shown to vary in the combined oxide content from about 87–92% and in calcium oxide content from about 4 to about 8%. Evaluating these values against the ASTM C618-00, one observes that the acceptable fly ashes came under the Class-C specifications, while the unacceptable ashes fell in the Class-F specification. Thus, this patent in effect establishes that Class-C fly ashes are suitable for substantially higher levels of replacement for Portland cement in concrete mixes than are Class-F fly ashes, and this capacity is now generally recognized, with Class-C fly ashes being generally permitted up to about a 50% replacement level while maintaining the desirable physical properties of the concrete especially compressive strength.

In U.S. Pat. No. 4,240,952, Hulbert, et al. while also acknowledging the generally recognized a permissible limit of Class-F fly ash replacement for Portland cement of 20%, proposed replacement of at lest 50% up to 80%, provided the mix contained as special additives about 2% of gypsum and about 3% of calcium chloride by weight of the fly ash. The fly ash described for this purpose, however, was a Class-C fly ash analyzing about 28% calcium oxide and combined silica, alumina and ferric oxide content of about 63%. With up to 80% of this fly ash and the specified additives, compressive strengths comparable to straight Portland cement were said to be generally achievable. In one example using 140 pounds Portland cement and 560 pounds of fly ash (20:80 ratio) with conventional amounts of coarse and fine aggregate, and water and including the requisite additives, compressive strengths tested at 3180 psi for 7 days, 4200 psi for 14 days and about 5000 psi at 28 days.

In U.S. Pat. No. 4,018,617 and U.S. Pat. No. 4,101,332, Nicholson proposed the use of mixtures of fly ash (apparently Class-F in type), cement kiln dust and aggregate for creating a stabilized base supporting surface replacing conventional gravel or asphalt aggregate stabilized bases in road construction wherein the useful ranges were fly ash 6–24%, CKD 4–16% and aggregate 60–90%, with 8% CKD, 12% fly ash and 80% aggregate preferred. Compressive strength values for such measures as revealed in the examples varied rather erratically and generally exhibited only small increases in compression strength over the 7 to 28 day test period. Among the better results were for the preferred mixture wherein the values increased from about 1100 psi at 7 days to 1400 psi at 28 days. The addition of a small amount of calcium chloride improved those values by about 200 psi. On the other hand, the addition of 3% of lime stack dust recovered from a lime kiln significantly reduced the results to about 700 psi at 7 days to 900–1300 psi at 28 days. Elimination of the aggregate reduced the strength to a fraction of the values otherwise obtained, a mixture of 12% CKD and 88% fly ash alone showing strength values of only about 190–260 psi over the 28-day test period. Similarly, the choice of a finely divided aggregate such as fill sand resulted in about the same fractional level of strength values in the range of about 140–230 psi. A combination of finely divided and coarse aggregate in approximately equal amounts reduced the compressive strength values by about ½ with virtually no change over the test period, giving values ranging from 650–750 psi, except where 1% of Type 1 Portland cement was included which restored the strength values to about their original level, except at the initial 7 days period where the strength values were about 800–900 psi, increasing at 28 days to about 1200–1600 psi. Curiously, the best strength results were attained when 11.6% fly ash was combined with 3.4% lime with the balance crushed aggregate, the CKD being omitted entirely, for which the strength values while starting at a lower level of about 850–950 at 7 days increased to about 1700 psi at 28 days.

The combination of fly ash and lime stack dust incidentally mentioned in the later patent was explored further by Nicholson in U.S. Pat. No. 4,038,095 which concerns mixtures of about 10–14% fly ash, about 5–15% lime stack dust with the balance aggregate in the range of 71–85%. Somewhat inexplicably, the compressive results reported here for such mixtures do not reach the high level specified in the first two patents, the strength values specified being only about 1000 psi with the more general levels well below that depending on particular proportions.

In U.S. Pat. No. 4,268,316, Wills, Jr., discloses the use of mixtures of kiln dust and fly ash as a replacement for ground limestone and gypsum for forming a mortar or masonry cement, using proportions of about 25–55% Portland cement, about 25–65% CKD and 10–25% fly ash. When these mortar formulations were mixed with damp sand in the proportions of about one part cement mixture to 2.5–3 parts sand, compression strengths comparable to those of standard masonry cement composed of 55% cement clinkers 40% limestone and 5% gypsum were shown for mixtures containing 50% cement, 24–40% CKD and 15–25% fly ash. Inexplicably, in one example, when the cement content was increased to 55% with 35% CKD and 10-% fly ash, the compressive strengths dropped by about 30–40% at both the 7 day and 28 day ages to levels inferior to the standard material. As the cement content was decreased, with corresponding increases in the CKD, the compressive strength values dropped drastically. On the other hand, in another similar example mixtures containing 55% cement, 35% CKD and 10% fly ash proved superior, particularly at the 28 day age, in compressive strength, to mixtures containing 50% cement, 35% fly ash and 15% CKD as well as other standard masonry cements containing 50% cement, 47% limestone and 3% gypsum. Indeed, strength values dropped about 40% for the mixtures having a 5% reduction in cement and a corresponding 5% increase in the fly ash to values definitely inferior to the standard cements. Similar variations were shown under laboratory test conditions for comparable 50/35/15 mixtures dependent on the source of the fly ash while under actual construction conditions for the same mixtures, compressive strength values were reduced by about 50% for both the conventional masonry cement containing 55% Portland cement and comparable mixtures within the patented concept. The fly ash here was preferably Class-F with Class-C materials being less desirable.

In U.S. Pat. No. 4,407,677, Wills, Jr., went on to teach that in the manufacture of concrete products such as blocks or bricks, the fly ash usually employed in combination with Portland cement therein could be replaced in its entirety by CKD with modest improvement in early compressive strength values for such products. Thus, at one day and two day tests compressive strength values were shown of about 500–800 psi, but were said to increase to about 1200 psi after 28 days. The mixes disclosed here contained 0.4–0.9 parts cement, about 0.1–0.6 parts CKD and 10–12 parts aggregate combining both fine and coarse materials, such as expanded shale and natural sand in a weight ratio of 80/20. Masonry cements generally develop at least about 95% of their strength properties at 28 days age so that additional aging of the patented products would not be expected to result in any significant increase in their compressive strength values.

In U.S. Pat. No. 5,106,422, Bennett et al. teaches a self-hardening backfill material that utilizes Class-C fly ash as a primary constituent in conjunction with other fly ashes, such as Class-F fly ash, or other filler materials. The material can attain compressive strength of about 20 psi within about four hours, which is about 25 to 40 percent of its 28-day strength. The material, however, does not use cement and thus has low strength and is not useful in applications requiring concrete.

None of the above patents addresses the issue of early strength of concrete; therefore, there remains a need for concrete mixes containing fly ash with high early strength, because the addition of fly ash to concrete often results in slow setting. There are many advantages for having high early strength, such as allowing the concrete structure to be put into service sooner, thereby reducing labor cost, and allowing precast concrete and concrete masonry manufacturers to achieve rapid form and mold turnover.

SUMMARY OF THE INVENTION

An object of the instant invention relates a settable composition for improved early strength comprising cement, Class-F fly ash, Class-C fly ash, and CKD. In a preferred embodiment, the cement is present in an amount greater than about 50% by weight, the Class-F fly ash is present in an amount of about 1 percent to about 10 percent by weight, the Class-C fly ash is present in an amount of about 5 percent to about 25 percent by weight, and CKD is present in an amount of about 1 percent to about 15 percent by weight.

A further object of the instant invention relates a settable composition for improved early strength comprising cement, Class-F fly ash, slag, and CKD. In a preferred embodiment, the cement is present in an amount greater than about 50% by weight, the Class-F fly ash is present in an amount of about 2 percent to about 11 percent by weight, the slag is present in an amount of about 1 percent to about 15 percent by weight, and CKD is present in an amount of about 3 percent to about 20 percent by weight.

Methods of making concrete from the above compositions are also disclosed.

DETAILED DESCRIPTION OF THE INVENTION

Several different types of Portland cement are available and all are useful with the present invention. Type I is the general purpose variety and is most commonly employed but Type III is preferable for early strength application. Commercial blended cements, such as Type I-P, wherein 20% Class-F fly ash is blended with 80% by weight Portland cement clinker during pulverization should be avoided.

Any standard or common Class-F fly ash obtained from boilers and like furnaces used for the combustion of pulverized coal, particularly of a bituminous or anthracite type, and especially from coal-fired, steam-generating plants of electrical utilities, is suitable for use as the Class-F fly ash component of this invention. Such fly ash should have a combined silica, alumina and ferric oxide content of at least about 70% and preferably 80% or higher by weight and a lime (CaO) content below about 10%, usually about 6% by weight or less.

Any standard or common Class-C fly ash obtained from the burning of lignite or subbituminous coal is suitable for use as the Class-C fly ash component of this invention. Such Class-C fly ash generally contains more calcium and less iron than Class-F fly ash and has a lime content in the range of 15% to 30%.

Similarly, any common cement kiln dust (CKD) that is produced as a by-product during the industrial production of Portland cement would in principle be suitable for purposes of this invention. One specific CKD, obtained as a matter of convenience, from the Tarma Lone Star Cement Company cement plant at Roanoke, Va., has previously been found useful in the cement composition. Other various CKD can be found in the patent literature. For example, U.S. Pat. No. 4,018,617 to Nicholson mentioned previously, analyzed nine different samples of CKD.

Likewise, any blast furnace slag is appropriate for the present invention. Slag is a non-metallic coproduct produced in the production of iron in a blast furnace. It consists primarily of silicates, aluminosilicates and calcium-alumina-silicates. The molten slag usually comprises about twenty percent by mass of iron production. Different forms of slag products are produced depending on the method used to cool the molten slag. These products include air-cooled blast furnace slag, expanded or foamed slag, palletized slag, and granulated blast furnace slag. Granulated blast furnace slag satisfying ASTM 989 specification is preferred.

As will be established later, within the above limits for the compositions of the invention, the concrete produced therefrom exhibit substantially comparable or superior properties for use in general purpose cement construction, especially one-day compressive strength to corresponding all Portland cement mixes. This being the case, economic considerations may be an important factor in selecting a specific mix within such ranges. Under present market conditions, and dependent upon transportation distances from the available sources of the two components, CKD can be purchased somewhat more cheaply than can a standard Class-F fly ash. For example, fly ash might be purchased at a cost of $20.00 per ton including transportation expense of about $7.00 per ton; whereas CKD can be purchased for about $9.00 per ton including about $4.00 transportation expense. Where the relative expense significantly favors one of the products, such as CKD, it is economically advantageous to utilize a larger amount of the cheaper constituent. Thus a mix having CKD and Class-F fly ash would be cheaper to produce than a mix having only Class-F fly ash.

Concrete mixes using the present invention may also contain aggregate materials. The choice of aggregate material for concrete mixes using the present blends will pose not problem to the person skilled in the design of such mixes. The coarse aggregate should have a minimum size of about ⅜ inch and can vary in size from that minimum up to one inch or larger, preferably in gradations between these limits. Crushed limestone, gravel and the like are desirable coarse aggregates, and the material selected in any case should exhibit a considerable hardness and durability inasmuch as crumbly, friable aggregates tend to significantly reduce the strength of the ultimate concrete. The finely divided aggregate is smaller than ⅜ inch in size and again is preferably graduated in much finer sizes down to 200-sieve size or so. Ground limestone, sand and the like are common useful fine aggregates.

In accordance with the present invention, silica fume can also be added to the cement mixture to achieve high strength and chloride protection for the concrete. Silica fume is preferably used from 3–12 percent of the amount of cement that is being use in the mixture.

Other additives can also be used in accordance with the present invention, including, but is not limited to, water reducers, accelerators, air entrainment agents, as well as other additives that is commonly used in the concrete industry.

The mixes of the invention are prepared by homogeneously and uniformly mixing all of the mix ingredients including the Class-F fly ash, Class-C fly ash, slag, and CKD. The Class-F fly ash has a specific gravity of about 2.25, while that of CKD is around 2.70. These relatively small differences in specific gravities do not create any unusual problems in the preparation of the present compositions and any of the usual mixing techniques commonly employed in the concrete mix industry are suitable. The ultimate compositions are no more susceptible to undergo separation during handling and storage than are ordinarily concrete mixes. They can be transported and stored in the same manner as the ordinary mixes, as can the individual ingredients. The storage containers should, of course, be closed to protect the contents thereof from weather.

The following examples are given to illustrate the present invention. It should be understood that the invention is not limited to the specific conditions or details described in these examples.

The results in the following examples were actually obtained by preliminarily blending, in each case, the Class-F fly ash, Class-C fly ash, slag, and CKD together in accordance with the concept of the prior application and combining the blend with the other mix ingredients. However, the results would be identical if the same proportionate amount for each of the component was added separately to the remaining mix ingredients and the proportionate amounts of the Class-F fly ash, Class-C fly ash, slag, and CKD have been expressed in each case in terms of their relative weight percentages of the particular mix.

EXAMPLE 1

TABLE 1

| Mix # | Cement | Class-F fly ash | Class-C fly ash | CKD | 1 day PSI |
|---|---|---|---|---|---|
| 1 | 100% | 0 | 0 | 0 | 2450 |
| 2 | 80% | 20% | 0 | 0 | 1920 |
| 5 | 90% | 0 | 10% | 0 | 2190 |
| 6 | 70% | 0 | 30% | 0 | 1480 |
| 7 | 50% | 0 | 50% | 0 | 400 |
| 8 | 90% | 1% | 7.5% | 1.5% | 2860 |
| 9 | 70% | 3% | 22.5% | 4.5% | 2730 |
| 10 | 50% | 5% | 37.7% | 7.5% | 1510 |
| 35 | 90% | 1.5% | 5% | 3.5% | 3060 |
| 36 | 70% | 4.5% | 15% | 10.5% | 3090 |
| 37 | 50% | 7.5% | 25% | 17.5% | 2080 |
| 11 | 90% | 2% | 5% | 3% | 2870 |
| 12 | 70% | 6% | 15% | 9% | 2700 |
| 13 | 50% | 10% | 25% | 15% | 2010 |
| 14 | 90% | 3.5% | 5% | 1.5% | 2730 |
| 15 | 70% | 10.5% | 15% | 4.5% | 2390 |

TABLE 1-continued

| Mix # | Cement | Class-F fly ash | Class-C fly ash | CKD | 1 day PSI |
|---|---|---|---|---|---|
| 16 | 50% | 17.5% | 25% | 7.5% | 1840 |
| 17 | 70% | 27% | 3% | 0 | 1630 |
| 18 | 70% | 22.5% | 7.5% | 0 | 1500 |
| 19 | 70% | 15% | 15% | 0 | 1410 |
| 20 | 70% | 7.5% | 22.5% | 0 | 1510 |
| 21 | 70% | 3% | 27% | 0 | 1520 |

TABLE 2

| Mix # | 1 Day PSI | 7 Day PSI | 28 Day PSI |
|---|---|---|---|
| 1 | 2450 | 5860 | 7750 |
| 2 | 1920 | 4740 | 6660 |
| 5 | 2190 | 5830 | 7880 |
| 6 | 1480 | 5450 | 7350 |
| 7 | 400 | 4270 | 6250 |
| 8 | 2860 | 6220 | 7740 |
| 9 | 2730 | 5870 | 7350 |
| 10 | 1510 | 4820 | 6350 |
| 35 | 3060 | 6120 | 6880 |
| 36 | 3090 | 5540 | 6360 |
| 37 | 2080 | 4370 | 5550 |
| 11 | 2870 | 6120 | 7430 |
| 12 | 2700 | 5720 | 6980 |
| 13 | 2010 | 4700 | 6070 |
| 14 | 2730 | 6080 | 7590 |
| 15 | 2390 | 5550 | 6880 |
| 16 | 1840 | 4800 | 6250 |
| 17 | 1630 | 3940 | 5940 |
| 18 | 1500 | 4180 | 5970 |
| 19 | 1410 | 4570 | 6410 |
| 20 | 1510 | 5270 | 6970 |
| 21 | 1520 | 5500 | 7330 |

In Example 1, the cement mixes comprising Class-F fly ash, Class-C fly ash, and CKD (Mix #8–10, 35–37, and 11–16) are compared with cement mixes without CKD (Mix #1–2, 5–7, and 17–21). Samples were tested for compression strength in accordance with ASTM C-109. table 1 compares 1 day strength of the mixes; and Table 2 compares 1 day, 7 day, and 28 day strengths of the mixes.

EXAMPLE 2

TABLE 3

| Mix # | Cement | CF fly ash | CKD | 1 Day PSI | 7 Day PSI | 28 Day PSI |
|---|---|---|---|---|---|---|
| 1 | 100% | 0 | 0 | 2450 | 5860 | 7750 |
| 3 | 70% | 20% | 10% | 2690 | 4970 | 6360 |
| 4 | 70% | 30% | 0 | 1940 | 4810 | 6480 |

In Example 2, cement mixes comprising Class-F fly ash and CKD (Mix #3) are compared with the same mix without CKD (Mix #4) and all Portland cement (Mix #1). Samples were tested for compression strength in accordance with ASTM C-109.

CF ash is the product of a mixture of western and eastern coal. An all-western coal produces Class-C fly ash; and an all-eastern coal produces Class-F fly ash. Because of emissions and environmental concerns, power plants may burn a mixture of eastern and western coals. Further, the percentages of eastern and western coals may vary according to the needs of the individual power plant. The CF ash used in Example 2 is the product of a 50/50 blend of eastern and western coal.

EXAMPLE 3

TABLE 4

| Mix # | Cement | Class-F fly ash | Slag | CKD | 1 Day PSI | 7 Day PSI | 28 Day PSI |
|---|---|---|---|---|---|---|---|
| 22 | 100% | 0 | 0 | 0 | 2560 | 5900 | 7270 |
| 23 | 90% | 0 | 10% | 0 | 2340 | 5400 | 6700 |
| 24 | 70% | 0 | 30% | 0 | 1860 | 4920 | 7030 |
| 25 | 50% | 0 | 50% | 0 | 1190 | 4150 | 6840 |
| 26 | 90% | 3.6% | 1% | 5.4% | 3520 | 6020 | 6810 |
| 27 | 70% | 10.8% | 3% | 16.2% | 3070 | 4940 | 5830 |
| 28 | 50% | 18% | 5% | 27% | 1610 | 3240 | 4290 |
| 29 | 90% | 2.8% | 3% | 4.2% | 3360 | 6050 | 6950 |
| 30 | 70% | 8.4% | 9% | 12.6% | 3020 | 5430 | 6910 |
| 31 | 50% | 14% | 15% | 21% | 1780 | 3930 | 5550 |
| 32 | 90% | 2% | 5% | 3% | 3200 | 6140 | 7230 |
| 33 | 70% | 6% | 15% | 9% | 2880 | 5730 | 7170 |
| 34 | 50% | 10% | 25% | 15% | 1880 | 4910 | 6720 |
| 52 | 90% | 0.6% | 9% | 0.4% | 2510 | 5790 | 7790 |
| 53 | 70% | 1.8% | 27% | 1.2% | 2360 | 5500 | 6950 |
| 54 | 50% | 3% | 45% | 2% | 1330 | 4270 | 7240 |
| 55 | 90% | 6.3% | 1% | 2.7% | 2620 | 5600 | 7050 |
| 56 | 70% | 18.9% | 3% | 8.1% | 2330 | 4900 | 5790 |
| 57 | 50% | 31.5% | 5% | 13.5% | 1530 | 3440 | 5010 |
| 58 | 90% | 4.9% | 3% | 2.1% | 2670 | 5500 | 7310 |
| 59 | 70% | 14.7% | 9% | 6.3% | 2290 | 5040 | 6450 |
| 60 | 50% | 24.5% | 15% | 10.5% | 1610 | 3890 | 5640 |
| 61 | 90% | 3.5% | 5% | 1.5% | 2500 | 5650 | 7330 |
| 62 | 70% | 10.5% | 15% | 4.5% | 2130 | 5010 | 6920 |
| 63 | 50% | 17.5% | 25% | 7.5% | 1640 | 4320 | 6360 |

In Example 3, cement mixes comprising Class-F fly ash, slag, and CKD (Mix #26–34 and 52–63) are compared with all Portland cement (Mix #22) and mixes comprising just slag (Mix #23–63). Samples were tested for compression strength in accordance with ASTM C-109.

EXAMPLE 4

TABLE 5

| Mix # | Cement | Slag | CKD | 1 Day PSI | 7 Day PSI | 28 Day PSI |
|---|---|---|---|---|---|---|
| 23 | 90% | 10% | 0 | 2340 | 5400 | 6700 |
| 24 | 70% | 30% | 0 | 1860 | 4920 | 7030 |
| 25 | 50% | 50% | 0 | 1190 | 4150 | 6840 |
| 38 | 90% | 9% | 1% | 2720 | 5640 | 6840 |

TABLE 5-continued

| Mix # | Cement | Slag | CKD | 1 Day PSI | 7 Day PSI | 28 Day PSI |
|---|---|---|---|---|---|---|
| 39 | 70% | 27% | 3% | 2340 | 5480 | 7220 |
| 40 | 50% | 45% | 3% | 1710 | 4950 | 6890 |
| 41 | 90% | 7% | 3% | 3030 | 5810 | 6760 |
| 42 | 70% | 21% | 9% | 2920 | 5720 | 7050 |

In Example 4, cement mixes comprising slag and CKD (Mix #38–42) are compared with mixes comprising just slag (Mix #23–25). Samples were tested for compression strength in accordance with ASTM C-109.

EXAMPLE 5

TABLE 6

| Mix # | Cement | Class-C fly ash | Slag | CKD | 1 Day PSI | 7 Day PSI | 28 Day PSI |
|---|---|---|---|---|---|---|---|
| 23 | 90% | 0 | 10% | 0 | 2340 | 5400 | 6700 |
| 24 | 70% | 0 | 30% | 0 | 1860 | 4920 | 7030 |
| 25 | 50% | 0 | 50% | 0 | 1190 | 4150 | 6840 |
| 5 | 90% | 10% | 0 | 0 | 2190 | 5830 | 7880 |
| 6 | 70% | 30% | 0 | 0 | 1480 | 5450 | 7350 |
| 7 | 50% | 50% | 0 | 0 | 400 | 4270 | 6250 |
| 43 | 90% | 1% | 8% | 1% | 2590 | 5690 | 6890 |
| 44 | 70% | 3% | 24% | 3% | 2340 | 5580 | 7150 |
| 45 | 50% | 5% | 40% | 5% | 1720 | 5230 | 6990 |
| 46 | 90% | 1.5% | 7% | 1.5% | 2730 | 5710 | 7150 |
| 47 | 70% | 4.5% | 21% | 4.5% | 2440 | 5660 | 7590 |
| 48 | 50% | 7.5% | 35% | 7.5% | 1640 | 5090 | 7130 |
| 49 | 90% | 2.5% | 5% | 2.5% | 2690 | 5500 | 7090 |
| 50 | 70% | 7.5% | 15% | 7.5% | 2570 | 5500 | 6890 |
| 51 | 50% | 12.5% | 25% | 12.5% | 1980 | 5180 | 6830 |

In Example 5, cement mixes comprising Class-C fly ash, slag, and CKD (Mix #43–51) are compared with mixes comprising just slag (Mix #23–25) and mixes comprising just Class-C fly ash (Mix #5–7). Sample were tested for compression strength in accordance with ASTMC-109.

EXAMPLE 6

TABLE 7

| Mix # | Cement | Class-C fly ash | Class-F fly ash | Slag | CKD | 1 Day PSI |
|---|---|---|---|---|---|---|
| 23 | 90% | 0 | 0 | 10% | 0 | 2340 |
| 24 | 70% | 0 | 0 | 30% | 0 | 1860 |
| 25 | 50% | 0 | 0 | 50% | 0 | 1190 |
| 5 | 90% | 10% | 0 | 0 | 0 | 2190 |
| 6 | 70% | 30% | 0 | 0 | 0 | 1480 |
| 7 | 50% | 50% | 0 | 0 | 0 | 400 |
| 64 | 90% | 1.5% | 0.9% | 7% | 0.6% | 2450 |
| 65 | 70% | 4.5% | 2.7% | 21% | 1.8% | 2210 |
| 66 | 50% | 7.5% | 4.5% | 35% | 3% | 1470 |
| 67 | 90% | 2.5% | 1.5% | 5% | 1% | 2450 |
| 68 | 70% | 7.5% | 4.5% | 15% | 3% | 2220 |
| 69 | 50% | 12.5% | 7.5% | 25% | 5% | 1510 |

TABLE 8

| Mix # | 1 Day PSI | 7 Day PSI | 28 Day PSI |
|---|---|---|---|
| 23 | 2340 | 5400 | 6700 |
| 24 | 1860 | 4920 | 7030 |
| 25 | 1190 | 4150 | 6840 |
| 5 | 2190 | 5830 | 7880 |
| 6 | 1480 | 5450 | 7350 |
| 7 | 400 | 4270 | 6250 |
| 64 | 2450 | 5740 | 7750 |
| 65 | 2210 | 5490 | 7450 |
| 66 | 1470 | 4550 | 7200 |
| 67 | 2450 | 5610 | 7660 |
| 68 | 2220 | 5400 | 7420 |
| 69 | 1510 | 4800 | 7130 |

In Example 6, the cement mixes comprising Class-F fly ash, Class-C fly ash, slag, and CKD (Mix #64–69) are compared with cement mixes comprising only Class-C fly ash (Mix #5–7) and mixes comprising only slag (Mix #23–27). Samples were tested for compression strength in accordance with ASTM C-109. Table 1 compares 1 day strength of the mixes; and Table 2 compares 1 day, 7 day, and 28 day strengths of the mixes.

The invention has been disclosed broadly and illustrated in reference to representative embodiments described above. Those skilled in the art will recognize that various modifications can be made to the present invention without departing from the spirit and scope thereof.

What is claimed is:

1. A settable composition comprising cement, Class-F fly ash, Class-C fly ash, and cement kiln dust (CKD).

2. The settable composition of claim 1, wherein the cement is Portland cement.

3. The settable composition of claim 1, wherein the cement is present in an amount greater than about 50 percent by weight.

4. The settable composition of claim 1, wherein the Class-C fly ash is present in an amount of about 5 percent to about 25 percent by weight.

5. The settable composition of claim 1, wherein the Class-F fly ash is present in an amount of about 1 percent to about 10 percent by weight.

6. The settable composition of claim 1, wherein the CKD is present in an amount of about 1 percent to about 15 percent by weight.

7. The settable composition of claim 1, wherein the cement is present in an amount greater than about 50 percent by weight, the Class-C fly ash is present in an amount of about 5 percent to about 25 percent by weight, the Class-F fly ash is present in an amount of about 1 percent to about 10 percent by weight, and the CKD is present in an amount of about 1 percent to about 15 percent by weight.

8. A settable composition comprising cement, Class-F fly ash, slag, and cement kiln dust (CKD), wherein the cement is present in an amount greater than about 50 percent by weight.

9. The settable composition of claim 8, wherein the cement is Portland cement.

10. The settable composition of claim 8, wherein the Class-F fly ash is present in an amount of about 2 percent to about 11 percent by weight.

11. The settable composition of claim 8, wherein the slag is present in an amount of about 1 percent to about 15 percent by weight.

12. The settable composition of claim 8, wherein the CKD is present in an amount of about 3 percent to about 20 percent by weight.

13. The settable composition of claim 8, wherein the Class-F fly ash is present in an amount of about 2 percent to about 11 percent by weight, the slag is present in an amount of about 1 percent to about 15 percent by weight, and the CKD is present in an amount of about 3 percent to about 20 percent by weight.

14. A settable composition comprising cement, slag, and cement kiln dust (CKD), wherein the CKD is present in an amount of about 1 percent to 9 percent by weight.

15. The settable composition of claim 14, wherein the cement is Portland cement.

16. The settable composition of claim 14, wherein the cement is present in an amount greater than about 50 percent by weight.

17. The settable composition of claim 14, wherein the slag is present in an amount of about 9 percent to about 45 percent by weight.

18. The settable composition of claim 16, wherein the cement is present in an amount greater than about 50 percent by weight, and the slag is present in an amount of about 9 percent to about 45 percent by weight.

19. A settable composition comprising cement, Class-C fly ash, slag, and cement kiln dust (CKD) wherein the cement is present in an amount greater than about 50 percent by weight.

20. The settable composition of claim 19, wherein the cement is Portland cement.

21. The settable composition of claim 19, wherein the Class-C fly ash is present in an amount of about 1 percent to about 15 percent by weight.

22. The settable composition of claim 19, wherein the slag is present in an amount of about 8 percent to about 45 percent by weight.

23. The settable composition of claim 19, wherein the CKD is present in an amount of about 1 percent to about 15 percent by weight.

24. The settable composition of claim 19, wherein, the Class-C fly ash is present in an amount of about 1 percent to about 15 percent by weight, the slag is present in an amount of about 8 percent to about 45 percent by weight, and the CKD is present in an amount of about 1 percent to about 15 percent by weight.

25. A method of making concrete comprising steps of
   i) mixing the settable composition of claim 1 with water, sand, and gravel to form a mixture;

ii) forming the mixture into a shape; and iii) allowing the mixture to harden to form concrete.

26. The method of claim 25, wherein the cement is Portland cement.

27. The method of claim 25, wherein the cement is present in an amount greater than about 50 percent by weight based on the total weight of the settable composition.

28. The method of claim 25, wherein the Class-C fly ash is present in an amount of about 5 percent to about 25 percent by weight based on the total weight of the settable composition.

29. The method of claim 25, wherein the Class-F fly ash is present in an amount of about 1 percent to about 10 percent by weight based on the total weight of the settable composition.

30. The method of claim 25, wherein the CKD is present in an amount of about 1 percent to about 15 percent by weight based on the total weight of the settable composition.

31. The method of claim 25, wherein the cement is present in an amount greater than about 50 percent by weight, the Class-C fly ash is present in an amount of about 5 percent to about 25 percent by weight, the Class-F fly ash is present in an amount of about 1 percent to about 10 percent by weight, and the CKD is present in an amount of about 1 percent to about 15 percent by weight, wherein all percentages are based on the total weight of the settable composition.

32. A method of making concrete comprising steps of i) mixing the settable composition of claim 8 with water, sand, and gravel to form a mixture;

ii) forming the mixture into a shape; and iii) allowing the mixture to harden to form concrete.

33. The method of claim 32, wherein the cement is Portland cement.

34. The method of claim 32, wherein the Class-F fly ash is present in an amount of about 2 percent to about 11 percent by weight based on the total weight of the settable composition.

35. The method of claim 32, wherein the slag is present in an amount of about 1 percent to about 15 percent by weight based on the total weight of the settable composition.

36. The method of claim 32, wherein the CKD is present in an amount of about 3 percent to about 20 percent by weight based on the total weight of the settable composition.

37. The method of claim 32, wherein the Class-F fly ash is present in an amount of about 2 percent to about 11 percent by weight, the slag is present in an amount of about 1 percent to about 15 percent by weight, and the CKD is present in an amount of about 3 percent to about 20 percent by weight, wherein all percentages are based on the total weight of the settable composition.

38. A method of making concrete comprising steps of i) mixing the settable composition of claim 14 with water, sand, and gravel to form a mixture;

ii) forming the mixture into a shape; and iii) allowing the mixture to harden to form concrete.

39. The method of claim 32, wherein the cement is Portland cement.

40. The method of claim 38, wherein the cement is present in an amount greater than about 50 percent by weight based on the total weight of the settable composition.

41. The method of claim 38, wherein the slag is present in an amount of about 9 percent to about 45 percent by weight based on the total weight of the settable composition.

42. The method of claim 38, wherein the cement is present in an amount greater than about 50 percent by weight, and the slag is present in an amount of about 9 percent to about 45 percent by weight wherein all percentages are based on the total weight of the settable composition.

43. A method of making concrete comprising steps of i) mixing the settable composition of claim 19 with water, sand, and gravel to form a mixture;

ii) forming the mixture into a shape; and iii) allowing the mixture to harden to form concrete.

44. The method of claim 43, wherein the cement is Portland cement.

45. The method of claim 43, wherein the Class-C fly ash is present in an amount of about 1 percent to about 15 percent by weight based on the total weight of the settable composition.

46. The method claim 43, wherein the slag is present in an amount of about 8 percent to about 45 percent by weight based on the total weight of the settable composition.

47. The method of claim 43, wherein the CKD is present in an amount of about 1 percent to about 15 percent by weight based on the total weight of the settable composition.

48. The method of claim 43, wherein the Class-C fly ash is present in an amount of about 1 percent to about 15 percent by weight, the slag is present in an amount of about 8 percent to about 45 percent by weight, and the CKD is present in an amount of about 1 percent to about 15 percent by weight, wherein all percentages are based on the total weight of the settable composition.

* * * * *